(12) United States Patent
Gall et al.

(10) Patent No.: US 8,888,039 B2
(45) Date of Patent: Nov. 18, 2014

(54) METHOD AND DEVICE FOR THE LATERAL STABILIZATION OF AN AIRCRAFT

(75) Inventors: Pierre-Emmanuel Gall, Toulouse (FR); Christophe Cros, L'union (FR); Mickaël Lallemand, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 171 days.

(21) Appl. No.: 13/810,630

(22) PCT Filed: Jul. 13, 2011

(86) PCT No.: PCT/FR2011/051673
§ 371 (c)(1),
(2), (4) Date: Jan. 16, 2013

(87) PCT Pub. No.: WO2012/017152
PCT Pub. Date: Feb. 9, 2012

(65) Prior Publication Data
US 2013/0119193 A1    May 16, 2013

(30) Foreign Application Priority Data
Jul. 20, 2010  (FR) ...................................... 10 55895

(51) Int. Cl.
*B64C 9/00* (2006.01)
*B64C 5/10* (2006.01)
*B64C 11/00* (2006.01)
*B64C 5/06* (2006.01)

(52) U.S. Cl.
CPC . *B64C 5/10* (2013.01); *B64C 11/00* (2013.01); *B64C 5/06* (2013.01)
USPC .............................. 244/87; 244/92; 244/90 R

(58) Field of Classification Search
None
See application file for complete search history.

(56) References Cited

U.S. PATENT DOCUMENTS

| | | | | |
|---|---|---|---|---|
| 2,961,196 | A * | 11/1960 | Atkinson | 244/46 |
| 4,135,687 | A * | 1/1979 | Jones, Jr. | 244/90 R |
| 4,485,992 | A * | 12/1984 | Rao | 244/90 R |
| 4,541,593 | A * | 9/1985 | Cabrol | 244/45 R |
| 5,150,861 | A * | 9/1992 | Merkel et al. | 244/91 |
| 6,843,452 | B1 * | 1/2005 | Vassberg et al. | 244/203 |
| 8,282,038 | B2 * | 10/2012 | MacGregor et al. | 244/87 |
| 2010/0032519 | A1 * | 2/2010 | Chareyre et al. | 244/87 |
| 2013/0146718 | A1 * | 6/2013 | Tao et al. | 244/90 R |

FOREIGN PATENT DOCUMENTS

| | | |
|---|---|---|
| DE | 748 739 | 11/1944 |
| DE | 1 283 097 | 11/1968 |
| GB | 820 009 | 9/1959 |
| JP | 54-59798 | 5/1979 |

OTHER PUBLICATIONS

International Search Report dated Jan. 12, 2011.

* cited by examiner

*Primary Examiner* — Christopher P Ellis
*Assistant Examiner* — Medhat Badawi
(74) *Attorney, Agent, or Firm* — Dickinson Wright PLLC

(57) ABSTRACT

The stabilizing device (1) comprises auxiliary stabilizers (6) which are mounted on the horizontal tailplane (2) of the aircraft and which generate a lateral stabilizing effect when brought into a deployed position.

21 Claims, 4 Drawing Sheets

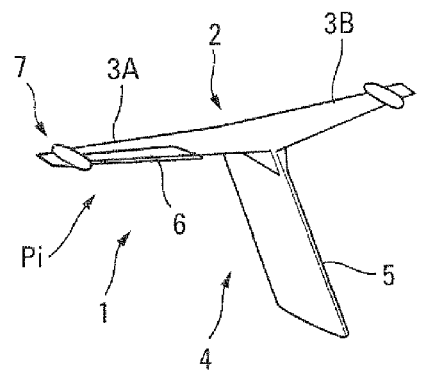
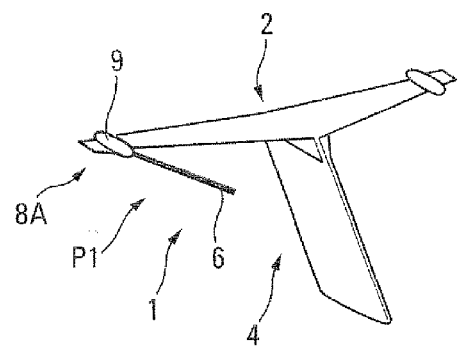
Fig. 1A　　　　　　　　　　Fig. 1B
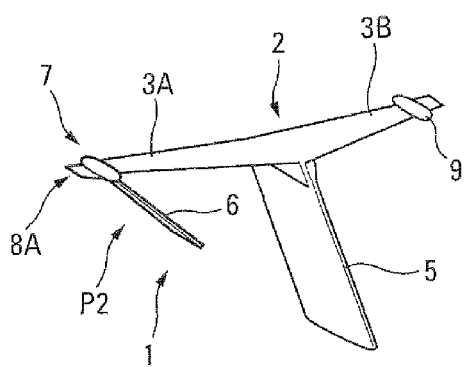
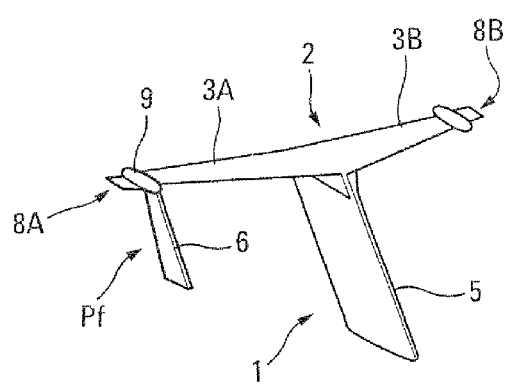
Fig. 1C　　　　　　　　　　Fig. 1D

METHOD AND DEVICE FOR THE LATERAL STABILIZATION OF AN AIRCRAFT

The present invention relates to a device and a method for the lateral stabilization of an airplane, particularly a transport airplane.

Although not exclusively, the present invention relates more particularly to an airplane using a propulsion system of unducted propellers in order to minimize fuel consumption, the engines of which system are installed at the rear of the fuselage, and which airplane preferably has a T-type tail.

It is known that one of the propulsion solutions that is the most promising in terms of reducing fuel consumption is to use engines with unducted propellers, because these engines have a 20% lower consumption than engines of conventional design. What is more, the use of contra-rotating double propellers means that high cruising speeds can be attained for a small size (diameter).

In addition, a drive installation using such engines arranged at the rear of the fuselage offers numerous additional advantages, notably:
a reduction in the noise inside the cabin, as only the rear part of the cabin is affected by the noise of the engines, in contrast with a conventional installation of the engines under the wing structure; and
the possibility of providing a bulky drive installation which would be difficult to incorporate under an airplane wing structure.

It is also known that the propellers of propeller engines installed at the rear of the fuselage also contribute to the longitudinal and lateral stability of the airplane. In particular, they contribute to improving directional stability, which qualifies the extent to which an airplane is damped with respect to a phenomenon of coupled rolling/yawing oscillations known as "dutch roll". Specifically, a propeller subjected to an incident air flow produces an aerodynamic force, just like any other lift-generating surface such as a wing or tail structure. Because the engines are situated at the rear with respect to the center of gravity of the airplane, the propellers could be likened to a tail and therefore contribute to stabilizing the airplane along the longitudinal and lateral axes thereof.

It could therefore be beneficial to use this additional stabilizing effect to reduce the surface area of the vertical tail and therefore the overall drag and hence fuel consumption of the airplane.

This stabilizing effect is not very dependent on the thrust demanded of the engine. Specifically, it is dependent primarily on the rotational speed of the propeller, which for this type of engine varies little in the various phases of flight. The stabilizing effect afforded by propellers is therefore as effective at minimum thrust as it is at maximum thrust.

However, the possibility of an engine failure does need to be taken into consideration because in the event of an engine failure, the stabilizing effect of this engine is reduced as the rotational speed of the propellers is then generally of the order of 10% of the normal operating speed. In certain cases (if the propellers jam), the rotational speed may even be zero. So, with just one engine failure, the engine that remains operational continues to contribute, as does the tail, toward the stability of the airplane. By contrast, in the event of a double engine failure of a twin-engine airplane, only the intrinsic stability of the airplane remains (to which there may be added a small stabilizing effect of the propellers if these are feathered, although this is of far less significance than during normal operation).

Now, sufficient airplane stability has to be maintained whatever the flight situation and this means that, in theory, the stabilizing effect of the propellers cannot be used to full advantage in reducing the vertical tail of the airplane.

It is an object of the present invention to overcome the abovementioned disadvantages. The invention relates to a method for laterally stabilizing an airplane, particularly a transport airplane, in all the phases of flight, including high speed cruising flight, said airplane being equipped with a horizontal tail comprising tail parts arranged on either side of the airplane, and notably an airplane provided with a propulsion system of unducted propellers, the engines of which are installed at the rear of the fuselage and which, in particular, has a T-type tail.

To this end, according to the invention, said device is notable in that it comprises:
at least one auxiliary stabilizer, which is associated with one of said tail parts; and
actuating means allowing the auxiliary stabilizer to be brought:
from an inactive retracted position, in which said auxiliary stabilizer is retracted with respect to the associated tail part so as to generate limited drag;
into an active deployed position, in which said auxiliary stabilizer is deployed with respect to the associated tail part in such a way as to have a lateral stabilizing effect on the airplane.

In a preferred embodiment, said device comprises at least two auxiliary stabilizers, each of which is associated with one of said tail parts, preferably symmetrically.

Thus, by virtue of the invention, one or more auxiliary stabilizer(s) is or are provided that generate a lateral stabilizing effect, and do so only when brought into a deployed position. This deployed position can be commanded as soon as specific conditions, such as engine failures, occur, as specified hereinbelow.

By contrast, in the retracted position, each auxiliary stabilizer is made one with the associated tail part, as specified hereinbelow, so as to limit the aerodynamic drag produced by the presence of this auxiliary stabilizer, in order to limit the impact it has on airplane performance.

According to one preferred embodiment, in the deployed position, each auxiliary stabilizer is brought into a plane substantially parallel to the local flow where it is situated, namely in a vertical plane substantially parallel to the plane of symmetry of the airplane.

In addition, for preference, in this deployed position, each auxiliary stabilizer is connected to the free end of the associated tail part. However, it is equally conceivable for the region of attachment to be faced away from this free end.

Moreover, advantageously, said actuating means comprise, for each auxiliary stabilizer, a deployment system which causes the auxiliary stabilizer to move from the retracted position to the deployed position.

In a first preferred embodiment, said deployment system performs a movement by pivoting, and said actuating means comprise, for each auxiliary stabilizer, a hinge which connects the auxiliary stabilizer to the associated tail part and allows the auxiliary stabilizer to pivot from the retracted position to the deployed position. In this case, said deployment system may be formed in such a way as to cause pivoting toward the outside or toward the inside of the airplane.

Furthermore, in a second embodiment, said deployment system may perform telescopic deployment.

In addition, in a third embodiment, it is envisaged for said deployment system to be able to perform a deployment that combines both a translational and a pivoting movement.

Moreover, in one particular embodiment, said actuating means additionally comprise, for each auxiliary stabilizer, a pin system for locking the auxiliary stabilizer in the deployed position.

Furthermore, in one particular embodiment, said device comprises at least one attachment means that allows said auxiliary stabilizer to be kept in said retracted position.

Moreover, advantageously, each auxiliary stabilizer comprises rigidifying means which may advantageously comprise means for weighting the free end of the auxiliary stabilizer, and/or a deployable stay, one end of which is fixed to the auxiliary stabilizer and the other end of which is fixed to the associated tail part. This rigidifying is needed for use of the device in cruising flight.

Moreover, advantageously, said device additionally comprises a seal system sealing the assembly formed by each auxiliary stabilizer and the associated tail part when said auxiliary stabilizer is in the retracted position. This seal system makes it possible for the impairment in performance at high speed to be limited (or even rendered negligible).

In one preferred embodiment, each auxiliary stabilizer is housed, in the retracted position, inside a box section of the associated tail part, so as to obtain an overall profile that allows the horizontal tail maximum efficiency in this position, notably by limiting the aerodynamic drag.

Furthermore, in one preferred embodiment, each auxiliary stabilizer is deployed toward the bottom of the associated tail part. However, it is also conceivable for each auxiliary stabilizer to be deployed upward. Furthermore, in one particular embodiment, said device may comprise at least one stabilizer which, in the deployed position, is deployed toward the top of the associated tail part and at least one stabilizer which, in the deployed position, is deployed toward the bottom of the associated tail part.

The present invention also relates to a method for laterally stabilizing an airplane, particularly a transport airplane, which is equipped with a horizontal tail comprising tail parts arranged on either side of the airplane.

According to the invention, this method is notable in that the airplane is monitored so as to be able to detect conditions in which to activate lateral stabilization, and in that when said activation conditions are detected, at least one auxiliary stabilizer, which is associated with one of said tail parts, is brought:

from an inactive retracted position, in which said auxiliary stabilizer is retracted with respect to the associated tail part so as to generate limited drag;

into an active deployed position, in which said auxiliary stabilizer is deployed with respect to the associated tail part so as to have a lateral stabilizing effect on the airplane.

In one preferred embodiment, when said activation conditions are detected, at least two auxiliary stabilizers, each of which is associated with one of said tail parts, are brought into the deployed position, preferably symmetrically. This makes it possible to ensure the symmetry of the airplane and to increase the overall stabilizing area deployed and hence the effectiveness of said device.

The present invention is preferably applied to an airplane comprising two unducted propeller engines in order to minimize the consumption of aviation fuel, the engines of which system are installed at the rear of the fuselage and which airplane, for example, has a T-type tail. In this preferred application, the conditions for activating stabilization correspond to simultaneous failures of said engines of the airplane.

The auxiliary stabilizers which are thus deployed only in the event of an engine failure notably make it possible to provide a reduced vertical tail area for the vast majority of flights, thus reducing drag and, therefore, fuel consumption of the airplane. The auxiliary stabilizers are deployed in the event of engine failure to compensate for the lack of stability caused by said failures.

The characteristics of the stabilization device, in terms of occurrence and performance, are therefore not very penalizing:

a slow deployment rate, given the period of oscillation of the "dutch roll" mode of the order of 30 s; and absence of retraction in flight following use. Reconfiguring the vertical tail for nominal use will be done as part of ground maintenance. That does not entail any on-cost in the operation of the airplane because the stabilization device according to the invention is used only infrequently, this device coming into action only in the event of an engine failure which in any event will give rise to a fairly in-depth airplane maintenance and analysis operation that will therefore ground the airplane.

Furthermore, the device according to the invention needs to be able to be deployed at high speed (i.e. at the cruising speed of the airplane).

The present invention also relates to an aircraft, particularly a transport airplane, which is provided with a device like the abovementioned one.

The figures of the attached drawing will make it easier to understand how the invention may be embodied. In these figures, identical references denote elements that are similar.

FIGS. 1A, 1B, 1C and 1D are schematic perspective views of a horizontal tail fitted with auxiliary stabilizers according to the invention, just one of which has been depicted, in four successive situations between a retracted position and a deployed position.

FIG. 2 schematically depicts a tail part equipped with an auxiliary stabilizer in a retracted position.

FIGS. 3A and 3B schematically depict an example of the locking of an auxiliary stabilizer in the deployed position.

Figure 2:
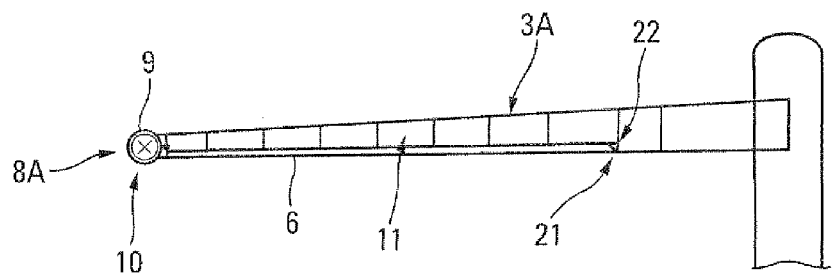

The device 1 according to the invention and depicted in the figures is intended to stabilize laterally an airplane, particularly a transport airplane, when specific conditions specified hereinbelow appear. This device 1 is applied to an airplane equipped with a horizontal tail 2 comprising tail parts 3A and 3B arranged on either side of the longitudinal axis of the airplane, and preferably to an airplane provided with a propulsion system using unducted propellers, the engines of which system are installed at the rear of the fuselage.

In the example depicted in FIGS. 1A to 1D in particular, said device 1 is applied to a T-type tail 4 comprising, in the conventional way, a vertical tail structure 5 (provided with a stabilizer), at the top of which the horizontal tail structure 2 is arranged.

According to the invention, said device 1 comprises:

at least one, but preferably (at least) two auxiliary longitudinal stabilizers 6, of flat overall shape, each of which is associated with one of said tail parts 3A and 3B. To simplify the drawing, just one auxiliary stabilizer 6 (associated with tail part 3A) has been depicted in FIGS. 1A to 1D, even though each tail part 3A, 3B is preferably equipped with one such auxiliary stabilizer 6; and actuating means 7 allowing each of said auxiliary stabilizers 6 to be brought:

from an inactive retracted position Pi, depicted in FIG. 1A, in which said auxiliary stabilizer 6 is longitudinally as one with the associated tail part 3A, 3B, so as to form an overall profile which provides the horizontal tail 2 with maximum effectiveness in this retracted position, notably by limiting drag, as specified hereinbelow with reference to FIG. 2. The auxiliary stabilizer 6 generates no lateral stabilization effect and is therefore inactive (as far as stabilization is concerned) in this retracted position Pi;

into an active deployed position Pf, depicted in FIG. 1D, in which said auxiliary stabilizer 6 is fixed substantially perpendicular to the associated tail part 3A, 3B (and substantially parallel to the vertical tail 5 provided with the stabilizer) so as to provide lateral stabilization of the airplane, as the stabilizer does. In this deployed position Pf, the auxiliary stabilizer 6, which is substantially planar, is therefore oriented parallel to a vertical plane of symmetry of the airplane, being laterally offset from the longitudinal axis. The auxiliary stabilizer 6 is thus located in a plane substantially parallel to the local flow.

FIGS. 1B and 1C depict intermediate positions P1 and P2 between the retracted position Pi and the deployed position Pf, to provide a clear illustration of how the auxiliary stabilizer 6 deploys (by pivoting, as specified hereinbelow).

Thus, the stabilization device 1 according to the invention comprises auxiliary stabilizers 6 which generate a lateral stabilizing action and do so only when brought into a deployed position Pf, namely when specific conditions such as engine failures occur, as specified hereinbelow.

By contrast, in the retracted position Pi, each auxiliary stabilizer 6 is made as one with the associated tail part 3A, 3B, as specified hereinbelow, so as to limit the aerodynamic drag produced by the presence of this auxiliary stabilizer 6 so as to limit the impact it has on airplane performance.

Further, according to the invention, the auxiliary stabilizers 6 are formed in such a way as to be able to be deployed at high speed (i.e. at the cruising speed of the airplane).

In the context of the present invention, the auxiliary stabilizers 6 may also be brought into deployed positions in which they are not perpendicular to the associated tail part 3A, 3B, for example into a position like the position P2 of FIG. 1C.

In one preferred embodiment, in the deployed position Pf, each auxiliary stabilizer 6 is fixed (substantially perpendicular) to the free end 8A, 8B of the associated tail part 3A, 3B. The auxiliary stabilizer 6 can thus pivot about an axis situated at the end of the tail. In this case, for preference, the streamlining 9 of the pivoting means constitutes the tip of the associated tail part 3A, 3B.

However, even though the effectiveness of the auxiliary stabilizer 6 in the deployed position Pf is reduced as a result, it is also conceivable for the region of connection (between the auxiliary stabilizer 6 and the associated tail part 3A, 3B) to be spaced away from this free end 8A, 8B and provided between this free end 8A, 8B and the junction with the vertical tail 5, but of course as close as possible to the free end 8A, 8B.

Said actuating means 7 therefore comprise, for each auxiliary stabilizer 6, an articulation 10 connecting the auxiliary stabilizer 6 to the associated tail part 3A, 3B and allowing the auxiliary stabilizer 6 to pivot from the retracted position Pi to the deployed position Pf. This articulation 10 may be a simple hinge embedded in the tip of the tail. In this case, there is no need for the hinge to be streamlined; provided the fit is correct, the effects on drag are insignificant because of the positioning of this element.

Said actuating means 7 additionally comprise an attachment means (not depicted), for example a hook, notably a hook of the same kind as for a landing gear, which is intended to keep said auxiliary stabilizer 6 in the retracted position Pi.

Further, said actuating means 7 also, for each auxiliary stabilizer 6, comprise a deployment system 12 which generates the pivoting movement of the auxiliary stabilizer 6 from the retracted position Pi to the deployed position Pf, i.e. from the inside toward the outside with respect to the airplane. A pivoting in the other direction (from the outside toward the inside) is also conceivable.

Said deployment system 12 may be arranged on the inside of the hinge 10 and notably consist of:

a conventional electric or hydraulic actuator; or according to a preferred embodiment, an axial spring.

The actuator (electric, hydraulic or spring) which is housed in the upstream part of the tip and of the hinge can be activated by receiving actuation information that can be transmitted via an electrical connection provided in the leading edge of the tail.

In one particular embodiment (which has not been depicted), said deployment system may be formed in such a way as to perform telescopic deployment and/or deployment that combines both translational and pivoting movement.

Given the slender thickness of the auxiliary stabilizer 6, and the fact that it is used at high speeds, the structural design criterion is to avoid what is known as flutter which is an oscillatory phenomenon associated with the coupling of aerodynamic loadings and structural response. This phenomenon is almost always divergent and causes the structure of a lift-generating surface to rupture when the structural limits of the material are exceeded. A structure that is sufficiently rigid does not go into resonance with the aerodynamic flow and is thus insensitive to the phenomenon of flutter.

Hence, each auxiliary stabilizer 6 comprises rigidifying means 13 to rigidify the structure upon deployment. For this purpose, there are two different solutions that can be employed, these being:

a first solution without longitudinal reinforcements; and a preferred second solution with a stay.

As far as the first rigidifying solution is concerned, there are two ways of countering the phenomenon of flutter:

providing the auxiliary stabilizer 6 with sufficient rigidity, either by making it thick enough or by increasing the thickness of the skins; and weighting the end of the auxiliary stabilizer 6. This solution additionally offers the advantage of assisting deployment, using gravity.

Figure 3A:
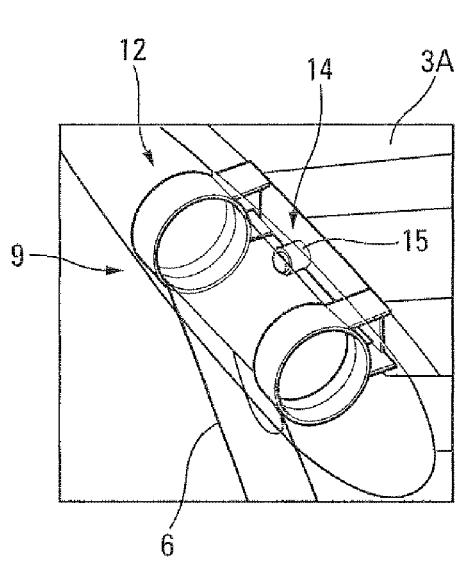
Figure 3B:
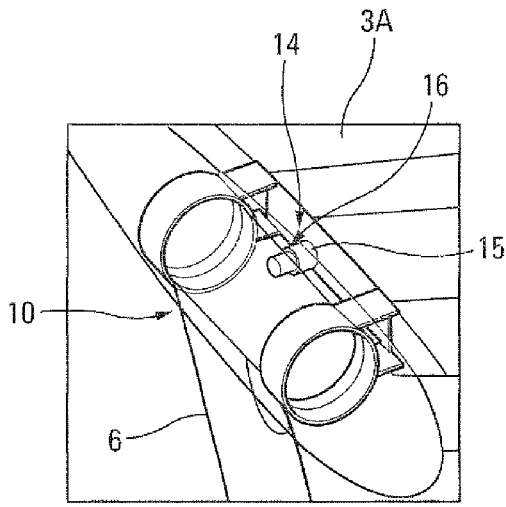

Locking in the deployed position Pf can be achieved using a pin system 14. This pin system 14 preferably comprises at least one pin 15 urged by a spring which is secured to the auxiliary stabilizer 6 and collaborates with a locking cavity 16 provided at the hinge 10, as depicted in FIGS. 3A and 3B. More specifically:

in the example of FIG. 3A, the auxiliary stabilizer 6 is in the process of deploying and the pin 15 is not engaged in the locking cavity 16; whereas in the example of FIG. 3B, the pin 15 is engaged in the locking cavity 16 and locking is effected (in the deployed position Pf).

This pin system 14 is simple and reliable (it can easily be made redundant), insofar as the auxiliary stabilizer 6 does not need to be folded back before the aircraft lands.

As far as said second (preferred) solution is concerned, the use of a stay 17 is more beneficial from a mass standpoint. The deployable stay 17 is fixed by one end 18 to the auxiliary stabilizer 6 and by the other end 19 to the associated tail part 3A, 3B.

This solution also allows locking open by a slight counter-angling of the stay backed up by one or more springs. Of course, a pin system 14 like the aforementioned one may also be combined with this solution.

Figure 4C:
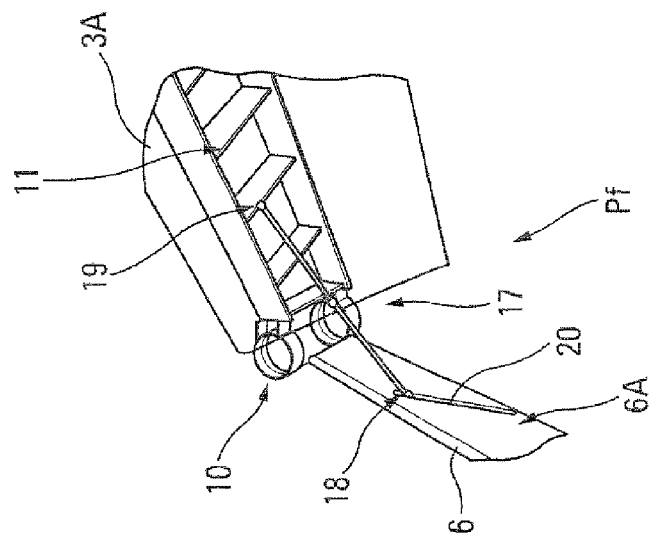
FIGS. 4A, 4B and 4C are schematic perspective views from beneath of a horizontal tail part equipped with an auxiliary stabilizer according to the invention, in three successive situations between the retracted position and the deployed position.
Figure 4B:
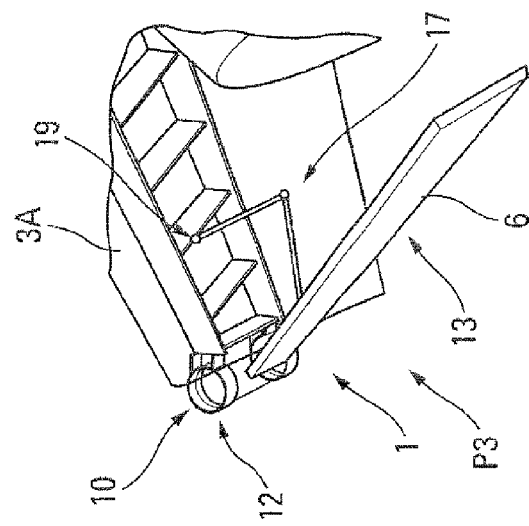
Figure 4A:
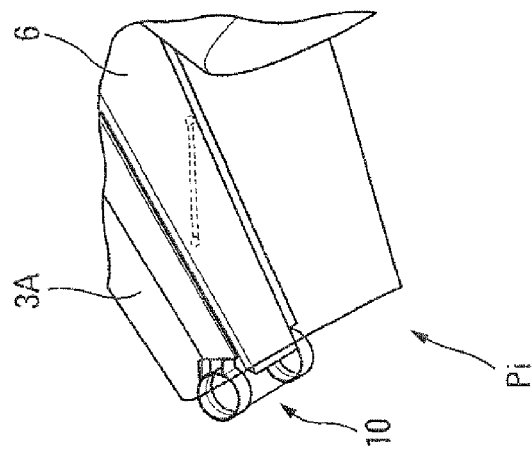

FIGS. 4A, 4B and 4C respectively show three successive positions during deployment using this second solution, namely the retracted position Pi, an intermediate position P3 and the deployed position Pf. FIG. 4C shows the cavity 20 in which the stay 17 is housed, which cavity is made in the internal face 6A of the auxiliary stabilizer 6.

Furthermore, each auxiliary stabilizer 6 is housed, in the retracted position, inside a box section 11 of the associated tail part 3A, 3B, so as to form an overall profile which ensures maximum effectiveness of the horizontal tail 2 in this retracted position, as depicted in FIG. 2.

The device 1 additionally comprises, for each auxiliary stabilizer 6, a seal system 21 which seals the assembly formed of this auxiliary stabilizer 6 and of the associated tail part 3A, 3B, when said auxiliary stabilizer 6 is in the retracted position. Seals 22 are preferably provided at the junction between the lower surface of the tail near its front spar and the leading edge of the auxiliary stabilizer 6, between the trailing edge of this auxiliary stabilizer 6 and the lower surface of the tail near its rear spar, and between the end of the auxiliary stabilizer 6 and the internal part of the tail (near its root).

Moreover, because the stabilization device 1 according to the invention is a single-use device, lubrication can be provided by a dry system, of the Teflon type, so that it does not require maintenance.

Figure 5:
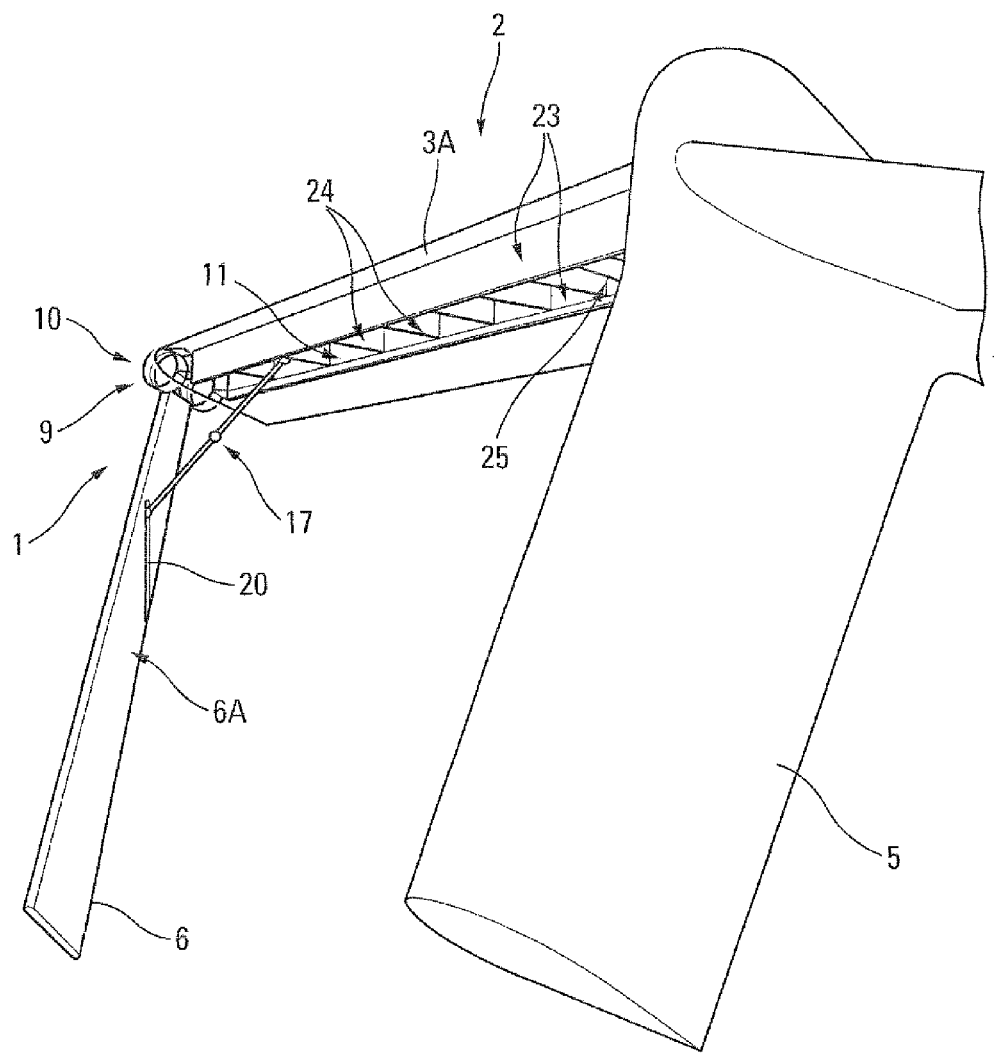
FIG. 5 is a schematic and perspective view from beneath of a horizontal tail part equipped with an auxiliary stabilizer which is in a deployed position.

Moreover, the preferred example of FIG. 5 notably depicts:
the tip hinge 10 with the pin surrounded by an aerodynamic streamlining 9;
the stay 17 in the deployed position;
the cavity 20 that houses the stay 17 which is provided in the auxiliary stabilizer 6;
the spars 23 of the box section 11 of the tail part 3A of the horizontal tail 2;
the ribs 24 of said box section 11; and
the site 25 of the hook that keeps the auxiliary stabilizer 6 in the retracted position.

Moreover, to implement the present invention, the conventional rib structure of the tail part 3A, 3B can be reinforced. In particular, the following may be reinforced:
a rib of the internal part of the tail which accepts a hook for keeping the auxiliary stabilizer folded;
a rib used for securing the stay 17, this attachment also potentially being fixed to the front spar; and
the external rib that closes the tail box section, to which rib the stators of the hinge 10 are attached using fish plates.

The present invention is preferably applied to an airplane comprising two unducted propeller engines, the engines of which are installed at the rear of the fuselage and which airplane, for example, has a T-type tail, as depicted in FIGS. 1A to 1D for example.

In this preferred application, because the intrinsic stability of the twin-engine aircraft is sufficient in the event of a single engine failure, deployment of the auxiliary stabilizers 6 is performed only in the event of double engine failure, the probability of occurrence of which is extremely low (of the order of $10^{-8}$). In this case, the device 1 is also equipped with means (not depicted) which monitor the airplane engines and are able to detect such a double failure.

The characteristics of the stabilization device 1 in terms of occurrence and performance are therefore not very penalizing:
a slow deployment rate, given the period of oscillation of the "dutch roll" mode of the order of 30 s; and
absence of retraction in flight following use.

Reconfiguring the vertical tail 5 for nominal use will be done as part of ground maintenance. That does not entail any on-cost in the operation of the airplane because the stabilization device 1 according to the invention is used only infrequently, this device 1 coming into action only in the event of an engine failure which in any event will give rise to a fairly in-depth airplane maintenance and analysis operation that will therefore ground the airplane.

The invention claimed is:

1. A device for laterally stabilizing an airplane fitted with a horizontal tail (2) comprising tail parts (3A, 3B) arranged on either side of the airplane, said device (1) comprising:
   at least one auxiliary stabilizer (6), which is associated with one of said tail parts (3A, 3B); and
   actuating means (7) allowing said auxiliary stabilizer (6) to be brought:
      from a first position (Pi);
      into an active deployed second position (Pf), in which said auxiliary stabilizer (6) is deployed with respect to the associated tail part (3A, 3B) in such a way as to have a lateral stabilizing effect on the airplane,
   wherein, in said first position (Pi) which is inactive, said auxiliary stabilizer (6) is retracted with respect to the associated tail part (3A, 3B) so as to generate limited drag, and each auxiliary stabilizer (6) is provided with rigidifying means (13).

2. The device as claimed in claim 1,
   wherein it comprises at least two auxiliary stabilizers (6), each of which is associated with one of said tail parts (3A, 3B).

3. The device as claimed in claim 1,
   wherein, in the deployed position (Pf), each auxiliary stabilizer (6) is brought into a plane substantially parallel to the corresponding local flow.

4. The device as claimed in claim 1,
   wherein said actuating means (7) comprise, for each auxiliary stabilizer (6), a deployment system (12) which causes the auxiliary stabilizer (6) to move from the retracted position (Pi) to the deployed position (Pf).

5. The device as claimed in claim 4,
   wherein said deployment system (12) performs a movement by pivoting, and said actuating means (7) comprise, for each auxiliary stabilizer (6), a hinge (10) which connects the auxiliary stabilizer (6) to the associated tail part (3A, 3B) and allows the auxiliary stabilizer (6) to pivot from the retracted position (Pi) to the deployed position (Pf).

6. The device as claimed in claim 5,
   wherein said deployment system (12) causes pivoting toward the outside of the airplane.

7. The device as claimed in claim 5,
   wherein said deployment system (12) causes pivoting toward the inside of the airplane.

8. The device as claimed in claim 4,
   wherein said deployment system performs telescopic deployment.

9. The device as claimed in claim 4,
   wherein said deployment system performs a deployment both translationally and in pivoting.

10. The device as claimed in claim 1,
wherein said actuating means (7) additionally comprise, for each auxiliary stabilizer (6), a pin system (14) for locking the auxiliary stabilizer (6) in the deployed position (Pf).

11. The device as claimed in claim 1,
wherein it additionally comprises at least one attachment means that allows said auxiliary stabilizer (6) to be kept in said retracted position (Pi).

12. The device as claimed in claim 1,
wherein said rigidifying means comprise means for weighting the free end of the auxiliary stabilizer (6).

13. The device as claimed in claim 1,
wherein said rigidifying means comprise a deployable stay (17), one end (18) of which is fixed to the auxiliary stabilizer (6) and the other end (19) of which is fixed to the associated tail part (3A, 3B).

14. The device as claimed in claim 1,
wherein it additionally comprises, for each auxiliary stabilizer (6), a seal system (21) sealing the assembly formed by this auxiliary stabilizer (6) and the associated tail part (3A, 3B) when said auxiliary stabilizer (6) is in the retracted position (Pi).

15. The device as claimed in claim 1,
wherein, in the retracted position (Pi), each auxiliary stabilizer (6) is housed in a box section (11) of the associated tail part (3A, 3B).

16. The device as claimed in claim 1,
wherein, in the deployed position (N), each auxiliary stabilizer (6) is deployed toward the bottom of the associated tail part (3A, 3B).

17. The device as claimed in claim 1,
wherein, in the deployed position, each auxiliary stabilizer is deployed toward the top of the associated tail part.

18. The device as claimed in claim 1,
wherein it comprises at least one stabilizer which, in the deployed position, is deployed toward the top of the associated tail part and at least one stabilizer which, in the deployed position, is deployed toward the bottom of the associated tail part.

19. A method for laterally stabilizing an airplane equipped with a horizontal tail (2) comprising tail parts (3A, 3B) arranged on either side of the airplane, in which method the airplane is monitored so as to be able to detect conditions in which to activate lateral stabilization, and when said activation conditions are detected, at least one auxiliary stabilizer (6), provided with rigidifying means (13), which is associated with one of said tail parts (3A, 3B), is brought:
   from an inactive retracted position (Pi), in which said auxiliary stabilizer (6) is retracted with respect to the associated tail part (3A, 3B) so as to generate limited drag;
   into an active deployed position (Pf), in which said auxiliary stabilizer (6) is deployed with respect to the associated tail part (3A, 3B) so as to have a lateral stabilizing effect on the airplane.

20. The method as claimed in claim 19,
wherein, when said activation conditions are detected, at least two auxiliary stabilizers (6), each of which is associated with one of said tail parts (3A, 3B), are brought into the deployed position (Pf).

21. The method as claimed in claim 19, for laterally stabilizing an airplane comprising two propeller engines arranged at the rear of said airplane,
wherein said engines are monitored, and the conditions for activating stabilization correspond to simultaneous failures of said engines.

\* \* \* \* \*